United States Patent

Hutchison et al.

[11] Patent Number: 5,092,263
[45] Date of Patent: Mar. 3, 1992

[54] BOAT UTILITY PLATFORM AND MOUNTING CLAMP THEREFOR

[76] Inventors: Brett C. Hutchison, 1264 Liard Drive, Prince George, British Columbia, Canada, V2M 3Z4; Larry E. Coster, 2759 Michener Crescent, Prince George, British Columbia, Canada, V2N 1H2

[21] Appl. No.: 530,320

[22] Filed: May 30, 1990

[30] Foreign Application Priority Data

May 30, 1989 [CA] Canada ................................ 601085

[51] Int. Cl.⁵ ............................................ B63B 17/00
[52] U.S. Cl. .................................... 114/364; 24/502;
43/54.1; 43/55; 224/920; 248/231.5; 248/231.8
[58] Field of Search ..................... 114/364, 255, 343;
224/920; 43/54.1, 55; 248/227, 231.3, 231.4, 231.5, 231.6, 231.7, 231.8

[56] References Cited

U.S. PATENT DOCUMENTS

| | | | |
|---|---|---|---|
| 557,773 | 4/1896 | DePlanty et al. | 248/231.06 |
| 2,707,089 | 4/1955 | Jackson | 248/231.5 |
| 2,834,138 | 5/1958 | Pedersen | 43/55 |
| 2,966,002 | 12/1960 | Hobson et al. | 43/55 |
| 3,015,467 | 1/1962 | Vieaux | 43/55 |
| 3,178,032 | 4/1965 | Patrick et al. | 248/227 |
| 3,220,140 | 11/1965 | Shirley | 43/55 |
| 3,668,739 | 6/1972 | Lewis | 43/55 |
| 3,765,632 | 10/1973 | Riggs | 248/231.7 |
| 3,775,895 | 12/1973 | Jachim | 43/54.1 |
| 4,671,009 | 6/1987 | Faunce | 43/54.1 |

FOREIGN PATENT DOCUMENTS

1141018  1/1969  United Kingdom ................ 24/502

Primary Examiner—Sherman Basinger
Assistant Examiner—Thomas J. Brahan
Attorney, Agent, or Firm—Shlesinger Arkwright & Garvey

[57] ABSTRACT

A boat utility platform has a pair of adjustable mounting clamps for hanging the platform from the gunwale of a boat. Each clamp includes an upper end which hooks over the gunwale and has an outermost tip for clamping abutment against the outside surface of the gunwale, and a lower end, the latter of which includes a rationally biased pivotally mounted jaw member for clamping abutment against the inside surface of the gunwale. The upper end of each clamp includes a hooking segment that follows the path of a substantially semi-elliptical arc, then tails to the outermost tip.

7 Claims, 7 Drawing Sheets

BOAT UTILITY PLATFORM AND MOUNTING CLAMP THEREFOR

FIELD OF THE INVENTION

This invention relates to clamps, and in particular to clamps for hanging or supporting a boat utility platform over the gunwale of a boat.

BACKGROUND TO THE INVENTION

The prior art reveals a variety of designs for boat utility platforms which are intended to hang over the gunwale of a boat, their purpose being to provide a convenient place for holding a boat user's accessories. Sometimes these platforms are general in their immediate purpose as in the case of the "boat organizer" described in U.S. Pat. No. 4,671,009 granted to Faunce on June 9, 1987; or the case of the "utility box" described in U.S. Pat. No. 3,301,619 granted to Mead on Jan. 31, 1967. In other cases, these platforms are more specific in their immediate purpose as in the case of the "container for fish lures" described in U.S. Pat. No. 3,775,895 granted to Jachim on Dec. 4, 1973; the case of the "portable tackle and bait holder" described in U.S. Pat. No. 4,271,624 granted to Peluso on June 9, 1981; or the case of the "fishing tackle boxes" described in U.S. Pat. No. 3,050,356 granted to Messmer on Aug. 21, 1962. In any case, these platforms are generally intended for relatively small boats with unfinished interiors such as aluminum boats, canoes and the like typical of what might be used by a recreational fisherman.

One of the problems with prior art designs is that they are not particularly adaptable from one boat to the next. Further, they generally fail to account for the fact that with a relatively small boat there can be a material degree of curvature in the gunwale and in the wall or hull below the gunwale, all in the immediate area where one may desire to hang the platform. These limitations can lead to difficulty with mounting the platform in a stable, level orientation.

Accordingly, an object of the present invention is to provide a new and improved boat utility platform and a new and improved mounting clamp particularly suited for a boat utility platform.

A further object of the present invention is to provide a mounting clamp for a boat utility platform that enables the platform to be mounted in a stable, level orientation and which can accommodate varying degrees of curvature in the gunwale or hull of a boat.

BRIEF DESCRIPTION OF THE INVENTION

In accordance with a broad aspect of the present invention, there is provided a mounting clamp for a boat utility platform, the mounting clamp comprising an upper end for hooking transversely over the top of a boat gunwale from an inside surface of the gunwale to an outside surface of the gunwale, and a lower end. The upper end includes an outermost tip for clamping abutment of the clamp against the outside surface of the gunwale. At the lower end, an elongated jaw member is pivotally mounted for rotation about a pivot axis, such jaw member including an outer end for clamping abutment of the clamp against the inside surface of the gunwale at a point across the thickness of the gunwale from the outermost tip of the upper end. In addition, a biasing means (for example, a spring) is provided for pivotally biasing the outer end of the jaw member about its pivot axis against the inside surface of the gunwale in the direction of this tip.

In a preferred embodiment of the present invention the outer end of the jaw member has a serrated, curvate profile for gripping abutment against the inside surface of the gunwale, and the upper end of the clamp includes an elliptically formed hooking segment.

Using a pair of such clamps adjustably mounted within and rearwardly extending from a boat utility platform, the platform may be mounted in a stable, level orientation on a variety of differing boats having varying degrees of gunwale and hull curvature.

The foregoing and other features and advantages of the present invention will now be described with reference to the drawings.

DETAILED DESCRIPTION

Figure 7:
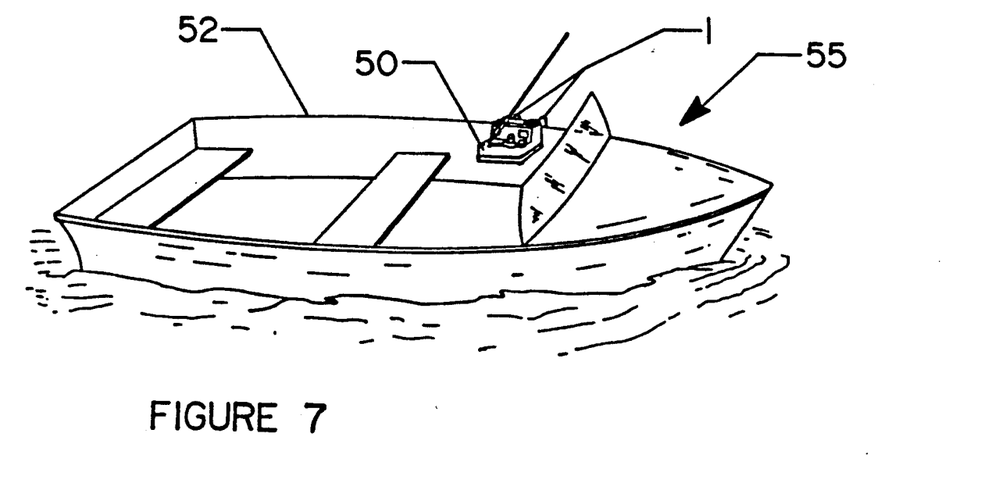
FIG. 7 illustrates the utility platform of FIG. 1 when mounted on the gunwale of a boat.

In FIGS. 1 through 10, there is illustrated a boat utility platform generally designated 50 comprising a housing or shell generally designated 8, a wooden top 11, and a bottom 35. Shell 8 comprises an upper front wall 8A, a lower horizontal wall 8B, a lower front wall 8C, parallel opposed side walls 8D, and a rear wall 8E. A pair of independently adjustable mounting clamps 1 are mounted within shell 8 of the platform and extend in parallel rearwardly therefrom through rear wall 8E for hanging the platform from the gunwale of the boat. A typical mounting position is shown in FIG. 7 which illustrates platform 50 hanging by means of clamps 1 from port side gunwale 52 of a boat generally designated 55.

Figure 3:
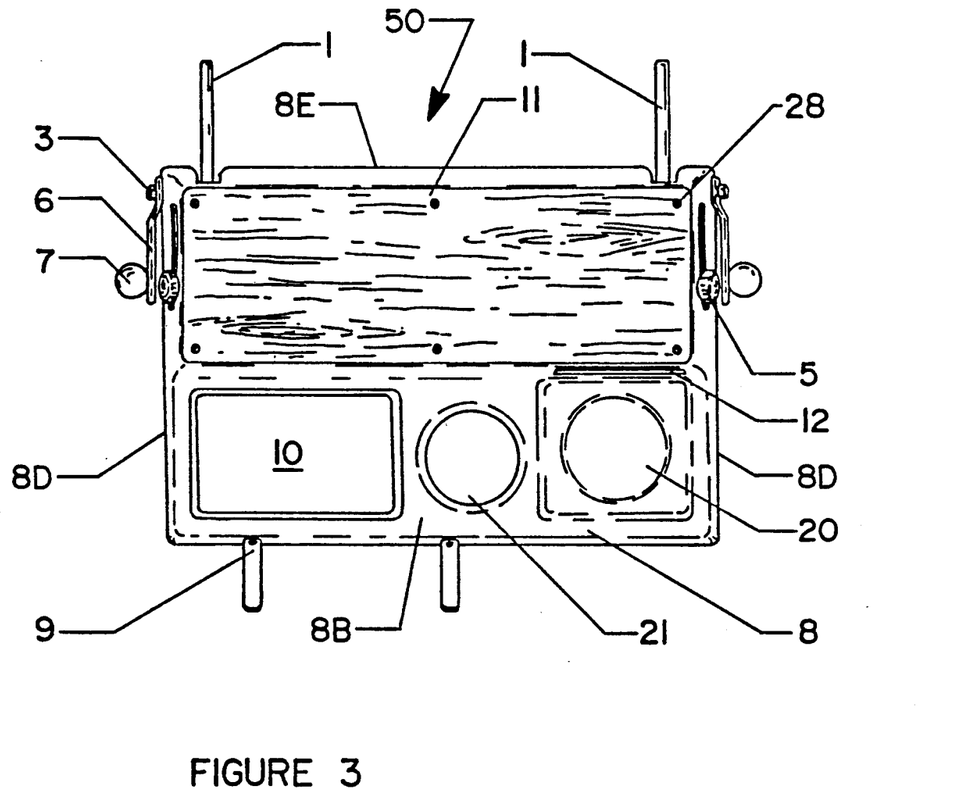
FIG. 3 is a top view of the utility platform shown in FIG. 1.
Figure 4:
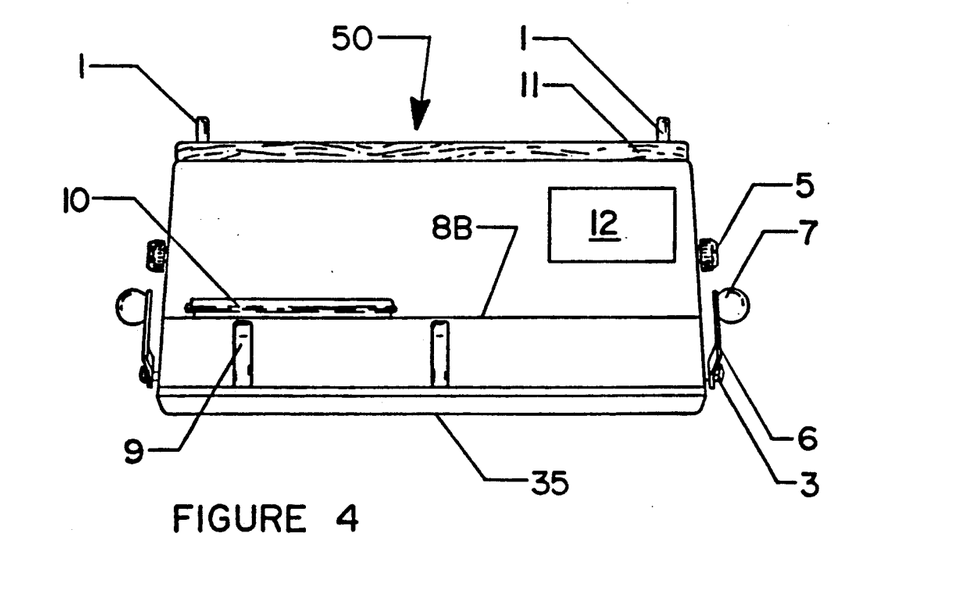
FIG. 4 is a front elevation view of the utility platform shown in FIG. 1.
Figure 5:
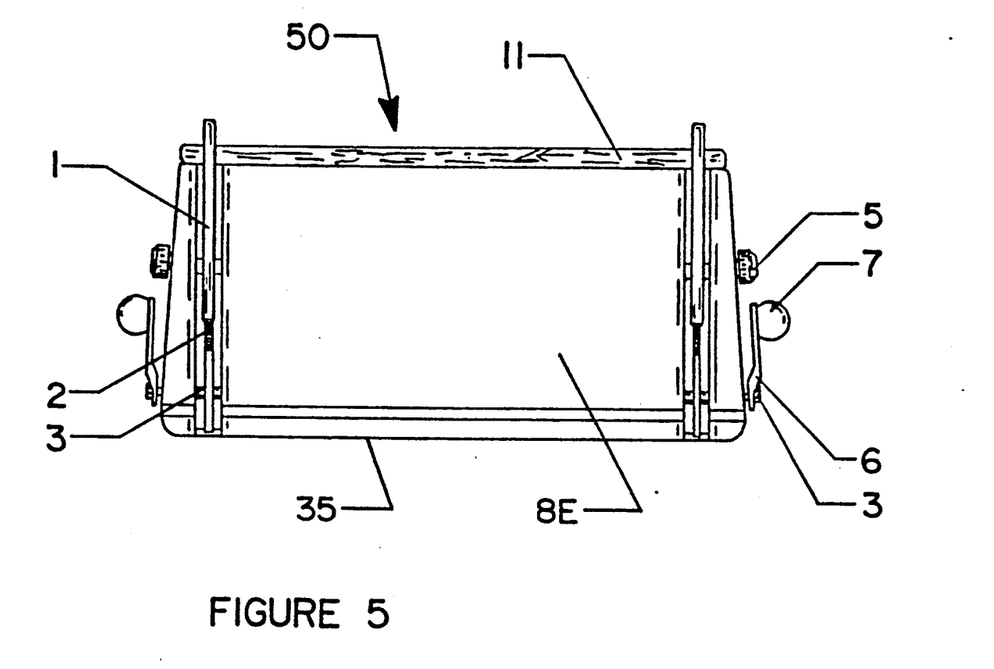
FIG. 5 is a rear elevation view of the utility platform shown in FIG. 1.
Figure 6:
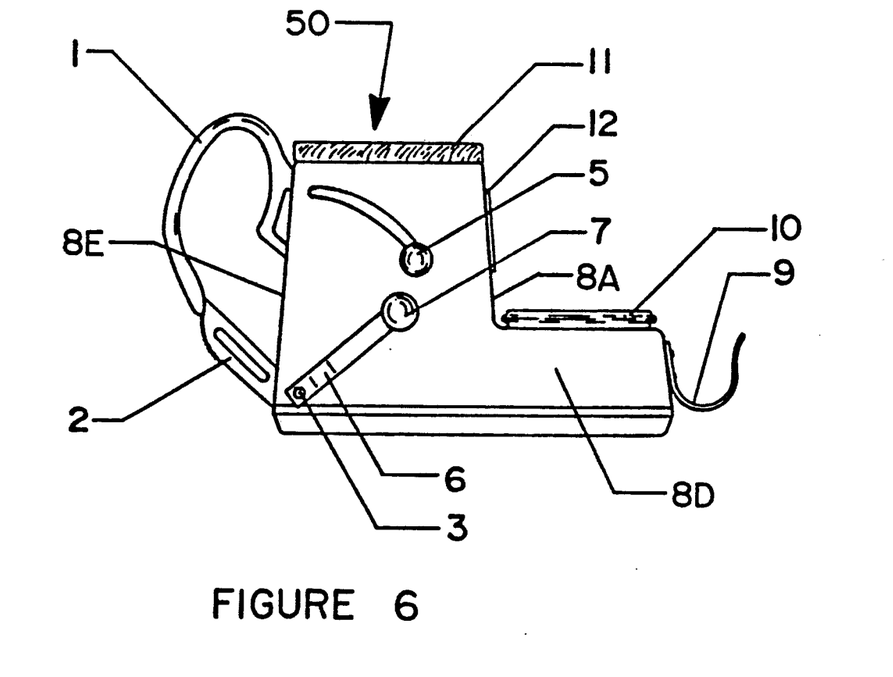
FIG. 6 is a side elevation view of the utility platform shown in FIG. 1.
Figure 9:
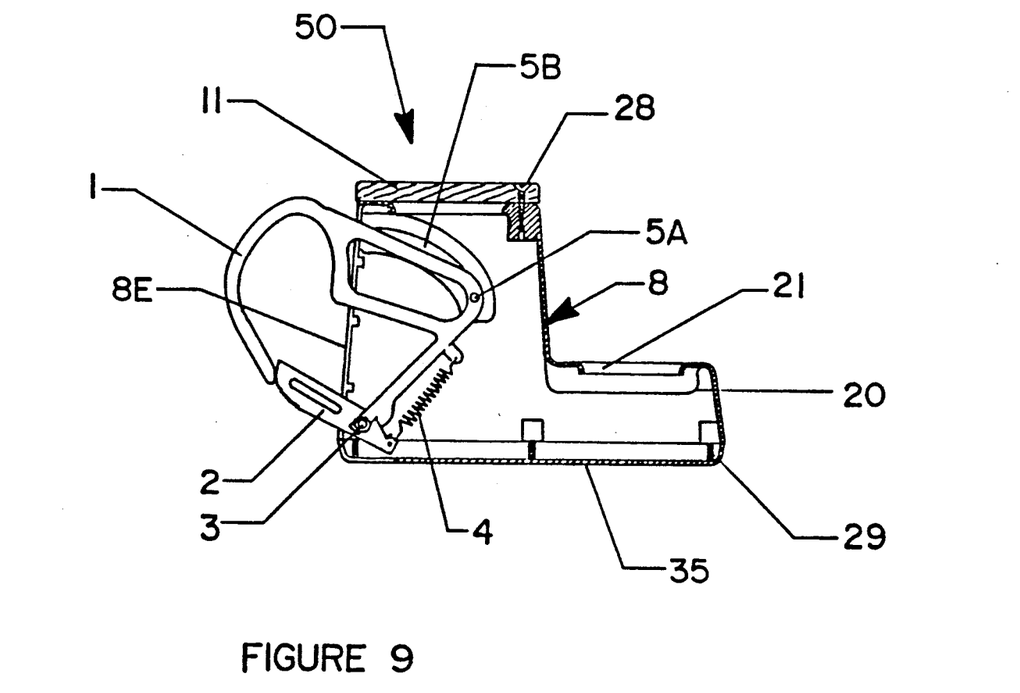
FIG. 9 is a side elevation view of the utility platform of FIG. 1, partially cut-away.
Figure 10:
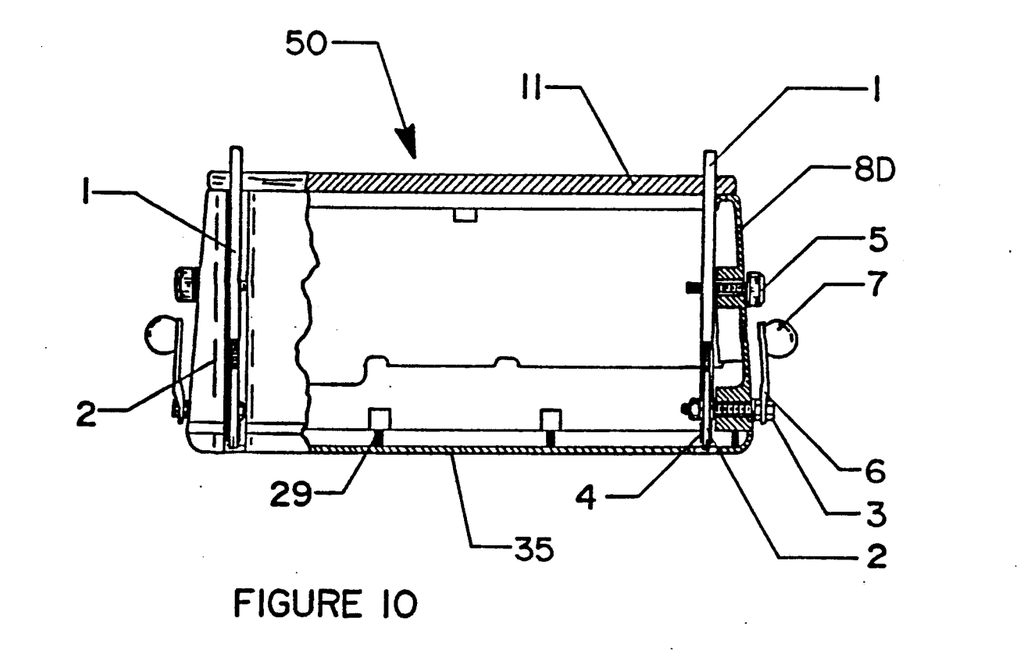
FIG. 10 is a rear elevation view of the utility platform of FIG. 1, partially cut-away.

Shell 8 is preferably fabricated or molded from plastic, as is bottom wall 35 which, as indicated in FIGS. 9 and 10, is attached to shell 8 by means of mounting screws 29. Top 11 may likewise be fabricated or molded from plastic. However, when wood is used as indicated in the drawings, the aesthetic appearance of the platform is enhanced. Further, from the point of view of a user, a wooden top 11 may be preferred as a readily replaceable base to which he may easily screw various articles or accessories of his choice. As indicated in FIGS. 3 and 9, top 11 is attached to shell 8 by means of screws 28. The structure and function of mounting clamps 1 is particularly illustrated in FIGS. 11 through 18. A mounting clamp 1 comprises an upper end 100 for hooking over the top of a boat gunwale 14, 15, 16, 17, 18, 19 from an inside surface 14A, 15A, 16A, 17A, 18A, 19A of the gunwale to an outside surface 14B, 15B, 16B, 17B, 18B, 19B of the gunwale, the various gunwales being shown in cross-section and partially cut-away in FIGS. 11 through 16. Upper end 100 has an outermost tip 102 for clamping abutment against the outside surface of the gunwale.

Figure 17:
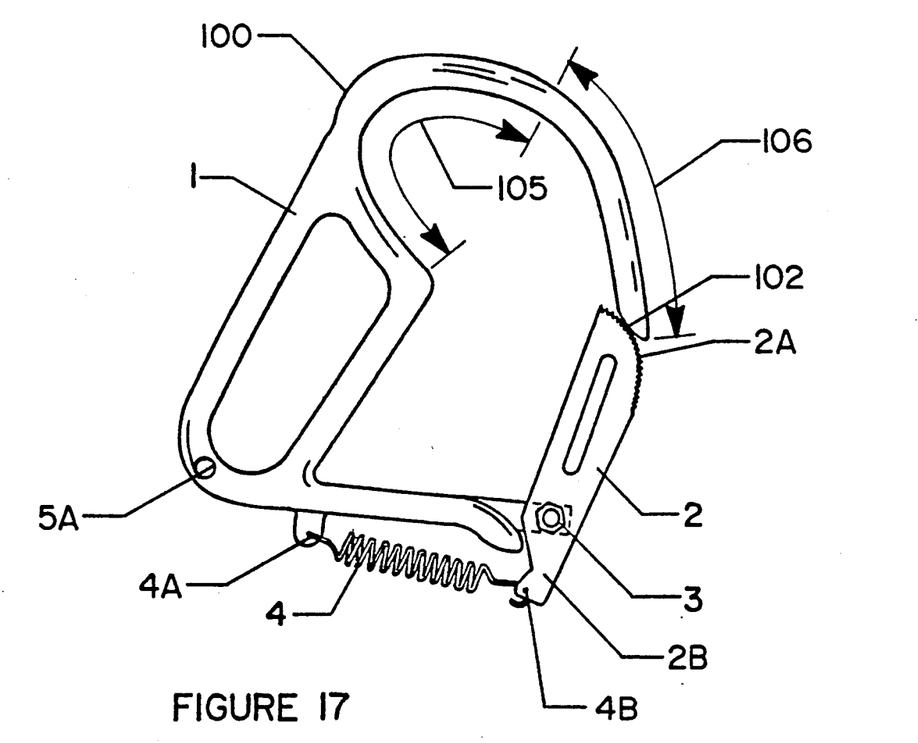
FIG. 17 illustrates a mounting clamp in accordance with the present invention prior to clamping or hooking over a gunwale.
Figure 18:
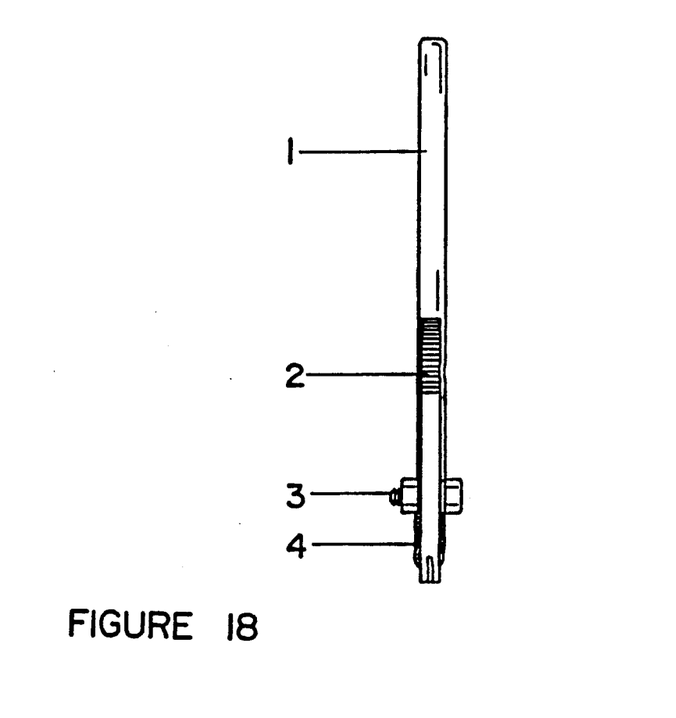
FIG. 18 is an elevation view of the clamp shown in FIG. 17 when viewed from the right in FIG. 17.

Mounting clamp 1 further comprises a lower end 110 to which an elongated jaw member 2 is pivotally mounted on pin 3 for rotation about the axis of the pin. Jaw member 2 has an outer end 2A for clamping abutment against the inside surface of the gunwale at a point across the thickness of the gunwale from outermost tip 102. The member is pivotally biased about the axis of pin 3 by means of a spring 4 attached at one end 4A to lower end 110 of the clamp away from the pivot axis, and at an opposed end 4B to an inner end 2B of the jaw member. The biasing action of spring 4 rotationally urges outer end 2A of jaw member 2 towards tip 102. As best seen in FIG. 17, and absent the presence of a gunwale wall as shown in FIGS. 11 through 16, outer end 2A will actually be urged against outermost tip 102.

Figure 11:
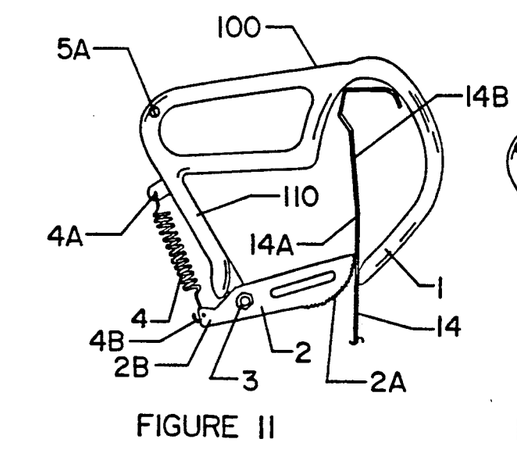
FIGS. 11 illustrate a mounting clamp in accordance with the present invention in a clamping or hooking position over differing configurations representative of gunwales.
Figure 12:
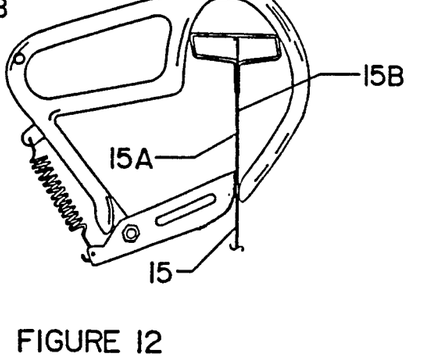
Figure 13:
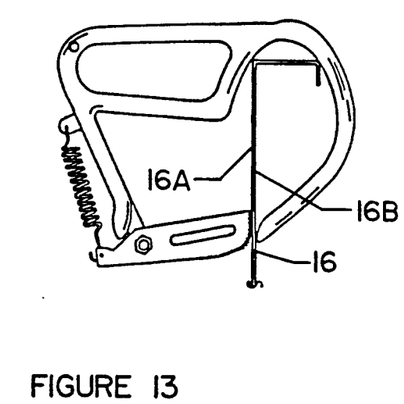
Figure 14:
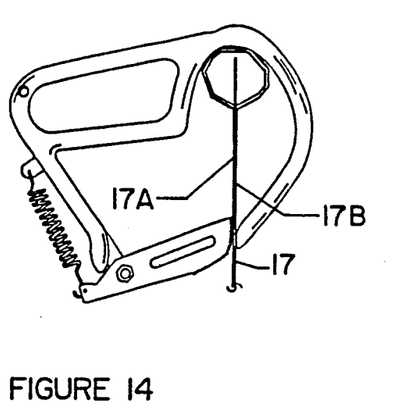
Figure 15:
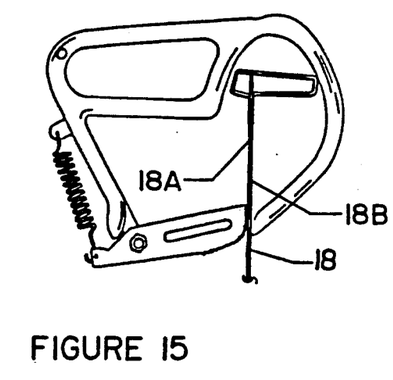
Figure 16:
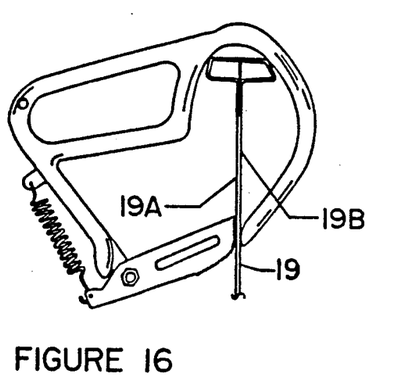

It will be further observed that outer end 2A of jaw member 2 has a curvate, serrated profile, the serrations serving to enhance the clamping grip of the jaw. The curvature of end 2A better enables the jaw to provide a grip against gunwales at differing angles of jaw rotation about pin 3. This angle of rotation and more generally the setting of clamp 1 as it hooks over a gunwale may depend not only on the width of the top of the gunwale where the clamp hooks over but also on curvature of the gunwale cross-section. In FIG. 11, for example, gunwale wall 14 does not come straight down from a central widthwise position relative to the gunwale as it does in the case of gunwale wall 15 as shown in FIG. 12. In the case of FIG. 13, gunwale wall 16 is displaced completely to one side relative to the top of the gunwale. Generally, FIGS. 11 through 16 show that clamp 1 can accommodate a variety of gunwale configurations.

When it is observed that clamp 1 can accommodate differing gunwale cross-section curvatures, it should be noted that the actual curvature above the point where outermost tip 102 and clamp 2 abut a gunwale across from one another is generally irrelevant—whether straight up as indicated in FIGS. 12 to 16, or angling to one side as indicated in FIG. 11.

With reference to FIG. 17, it will be seen that upper end 100 of clamp 1 includes a hooking segment defined by arrow 105. Over the length of this segment, and before tailing over tail segment 106 to outermost tip 102, upper end 100 follows the path of a substantially semi-elliptical arc. A precise semi-elliptical path is not essential. A substantially semi-elliptical path enables clamp 100 to better accommodate gunwales having differing configurations at the top (see FIGS. 11 to 16).

FIGS. 9 and 10 illustrate the manner in which a pair of mounting clamps 1 are independently mounted and independently adjustable within shell 8 of utility platform 50. As best seen with reference to the right side of FIG. 10, each mounting clamp is pivotally supported within the shell by means of a pivot pin 3 extending through side wall 8D to clamp 100 and by a tightenable guide pin 5 which extends through a curved race 5B in side wall 8D to threadingly engage the clamp through hole 5A. With reference to FIG. 9, it will be appreciated that the degree of reach or extension the clamp 100 may have from back wall 8E of the shell will be determined by the angle of rotation about pivot pin 3 while pin 5 travels within race 5B. This means that clamp 100 on one side of the platform may be adjusted to a different extension than clamp 100 on the other side, and this better enables positioning of the platform despite fore to aft curvature along the gunwale of a boat. One clamp may be adjusted to a relatively retracted position as illustrated in FIG. 9 while the other may be adjusted to a relatively extended position.

Handle 6 and knob 7 permit the user to easily make a desired adjustment. When the desired adjustment is achieved it may be fixed by tightening knob 5.

A utility platform such as platform 50 may be designed or utilized to support or carry a variety of different accessories or convenience items for the user. By way of illustration and example only, some possible items are illustrated in the FIGS., in particular FIG. 2.

Figure 1:
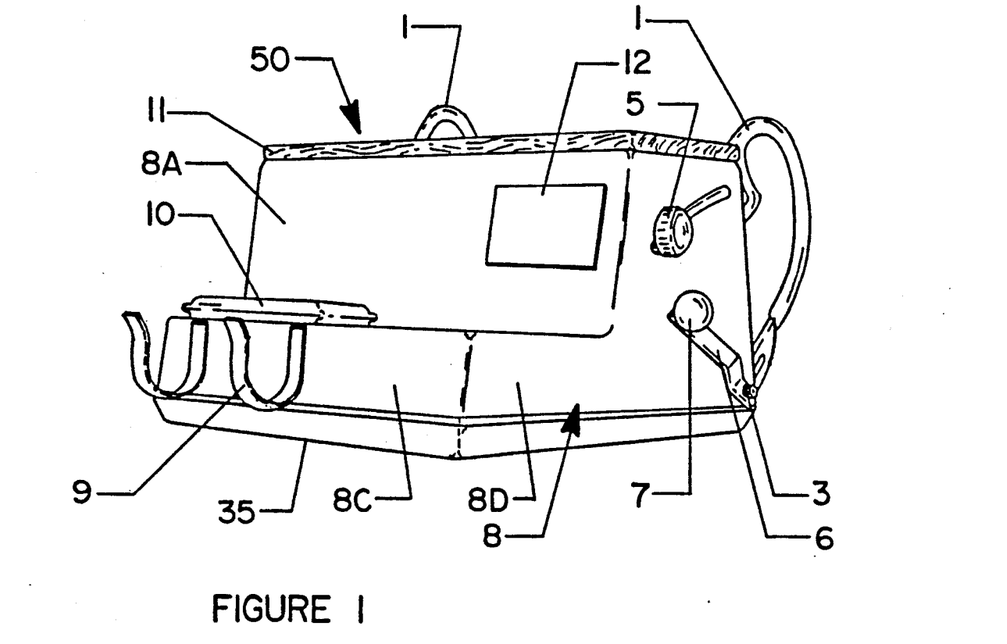
FIG. 1 is a perspective view of a boat utility platform with mounting clamps in accordance with the present invention.
Figure 2:
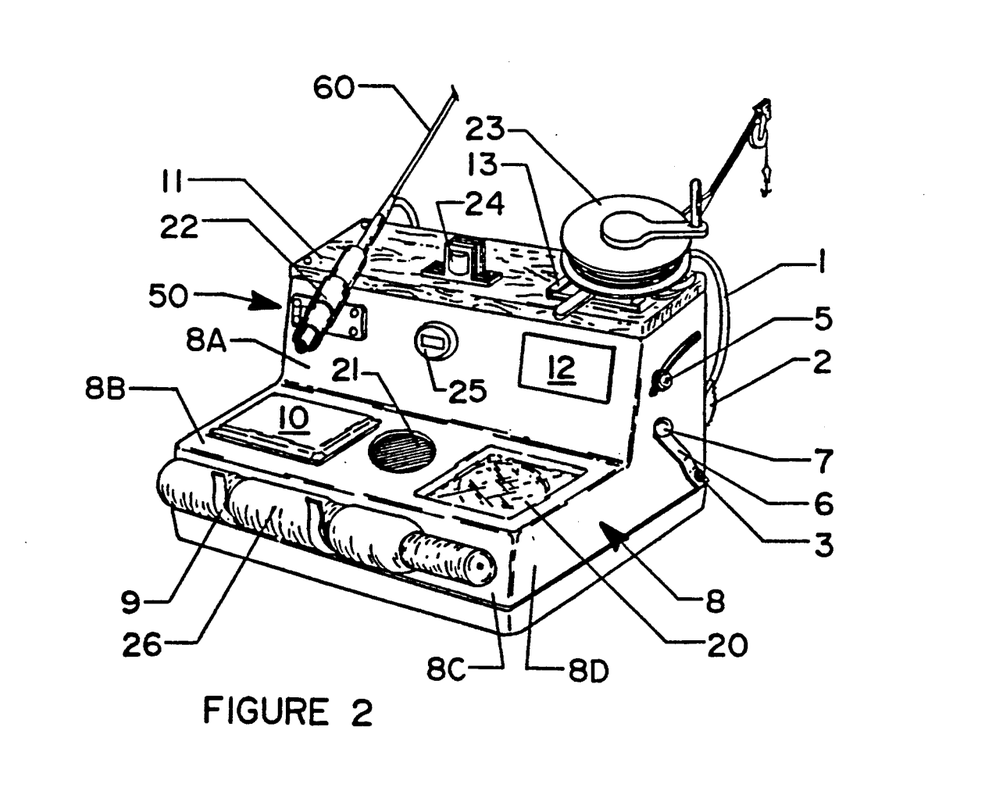
FIG. 2 is an oblique view of the utility platform of FIG. 1 shown when holding various accessories.

As may be seen in FIG. 2, a fishing rod 60 is supported by platform 50 by means of a bracket 22 attached to upper front wall 8A of shell 8. A downrigger 23 is supported by a conventional downrigger bracket 13 attached to wooden top 11. FIG. 2 also illustrates a compass 24 attached to wooden top 11, and a clock 25 and plate 12 attached to front wall 8A. (Plate 12 is a plate or label on which identification data may appear.)

Lower horizontal wall 8B of shell 8 is shown in FIG. 2 supporting a bait box 10. As well, wall 8B includes a circular recessed region 21 for holding a beverage cup or the like (not shown), and a recessed storage dish region 20 having two levels of depression (first, a square or rectangular depression, then, a circular depression). In FIG. 2, the cross-hatch lining over region 20 represents a clear plastic cover.

As can be seen in FIG. 2, lower front wall 8C of shell 8 is also utilized. Here, FIG. 2 illustrates a pair of brackets 9 attached to the wall, such brackets being used to hold a fish bonker 26.

Of course, it will be understood that the various elements just described in relation to FIG. 2 which are supported or carried by utility platform 50 are not part of the present invention. They simply serve to illustrate the practical facility that the particular design may have.

It is to be understood, and will be readily apparent to those skilled in the art, that the particular stepped or L-shaped configuration of utility platform 50, although considered to be a desirable overall shape, is not essential to the present invention. For example, the platform could have an overall rectangular box configuration, or other configurations.

Figure 8:
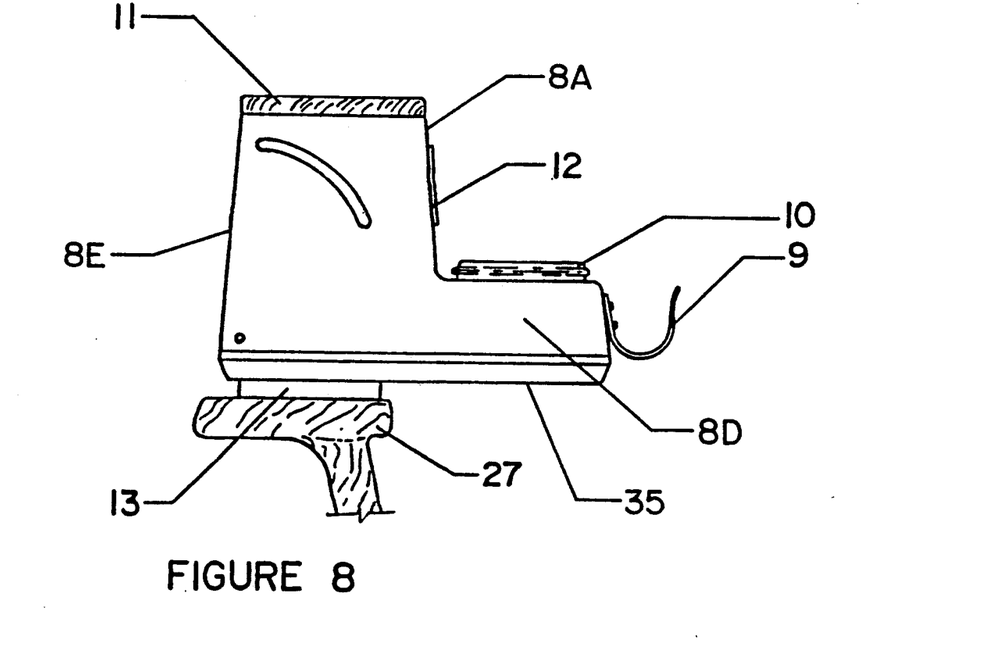
FIG. 8 is a side elevation view of the utility platform of FIG. 1 mounted directly on a horizontal base and without the mounting clamps in FIG. 1.

As indicated in FIG. 8, the particular platform that has been described can be mounted without mounting clamps 1 directly on the gunwale 27 of a boat. For this purpose a downrigger bracket 13 like the downrigger bracket 13 described in relation to FIG. 2 is used. Although not indicated in FIG. 8, bracket 13 is screwed both to gunwale 27 and to the bottom of shell 8. This particular arrangement, not having mounting clamps 1, is not considered to embody the present invention but does illustrate an added capability of the housing component.

Various modifications, changes, or departures from the particular embodiment that has been described are possible within the scope of the following claims, and will undoubtedly occur to those skilled in the art.

I claim:

1. A mounting clamp for a boat utility platform, said clamp comprising:
    (a) an upper end for hooking transversely over the top of a boat gunwale from an inside surface of the gunwale to an outside surface of the gunwale, said upper end including a hook segment that follows the path of a substantially semi-elliptical arc and a tail segment tailing from said hook segment to an outermost tip for clamping abutment of the clamp against said outside surface;
    (b) a lower end, including means for pivotally mounting said clamp to said platform about a pivot axis;
    (c) an elongated jaw member pivotally mounted at said lower end for rotation about said pivot axis, said jaw member having an outer end for clamping abutment of the clamp against said inside surface at a point across the thickness of said gunwale from said tip;
    (d) biasing means for pivotally biasing the outer end of said jaw member about said pivot axis against said inside surface in the direction of said tip.

2. A mounting clamp as defined in claim 1, the outer end of said jaw member having a serrated, curvate profile for gripping abutment against said inside surface.

3. A mounting clamp as defined in claim 2, said biasing means comprising a spring attached at one end to said lower end away from said pivot axis and at an opposed end to an inner end of said jaw member at a point radially opposed from said outer end.

4. A boat utility platform for holding boat user accessories, said platform including a pair of parallel mounting clamps adjustably mounted within and rearwardly extending from the platform for hanging the platform from a gunwale of a boat, said clamps each comprising:
    (a) an upper end for hooking transversely over the top of a boat gunwale from an inside surface of the gunwale to an outside surface of the gunwale, said upper end including a hook segment that follows the path of a substantially semi-elliptical arc and a tail segment tailing from said hook segment to an outermost tip for clamping abutment of the clamp against said outside surface;
    (b) a lower end, including means for pivotally mounting said clamp to said platform about a pivot axis;
    (c) an elongated jaw member pivotally mounted at said lower end for rotation about said pivot axis, said jaw member having an outer end for clamping abutment of the clamp against said inside surface at a point across the thickness of said gunwale from said tip;
    (d) biasing means for pivotally biasing the outer end of said jaw member about said pivot axis against said inside surface in the direction of said tip.

5. A boat utility platform as defined in claim 4 wherein said clamps are independently adjustable.

6. A boat utility platform as defined in claim 5, the outer end of said jaw member of each of said clamps having a serrated, curvate profile for gripping abutment against said inside surface.

7. A boat utility platform as defined in claim 6, said biasing means for each of said clamps comprising a spring attached at one end to the lower end of the clamp away from said pivot axis of the clamp and at an opposed end to an inner end of the jaw member of the clamp at a point radially opposed from said outer end of the jaw member of the clamp.

* * * * *